US009405391B1

(12) United States Patent
Mackraz

(10) Patent No.: US 9,405,391 B1
(45) Date of Patent: Aug. 2, 2016

(54) RENDERING CONTENT AROUND OBSCURING OBJECTS

(71) Applicant: Amazon Technologies, Inc., Reno, NV (US)

(72) Inventor: James D. Mackraz, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 88 days.

(21) Appl. No.: 13/975,973

(22) Filed: Aug. 26, 2013

Related U.S. Application Data

(63) Continuation of application No. 12/871,302, filed on Aug. 30, 2010, now Pat. No. 8,519,971.

(51) Int. Cl.
*G06F 3/041* (2006.01)
(52) U.S. Cl.
CPC .................... *G06F 3/0412* (2013.01)
(58) Field of Classification Search
None
See application file for complete search history.

(56) References Cited

U.S. PATENT DOCUMENTS

| 2007/0013716 | A1 | 1/2007 | Kjeldsen et al. |
| 2008/0211395 | A1 | 9/2008 | Koshihara et al. |
| 2009/0002326 | A1 | 1/2009 | Pihlaja |
| 2009/0267903 | A1 | 10/2009 | Cady et al. |
| 2009/0295753 | A1 | 12/2009 | King et al. |
| 2009/0319894 | A1 | 12/2009 | Markiewicz et al. |
| 2010/0103098 | A1 | 4/2010 | Gear et al. |
| 2010/0265170 | A1 | 10/2010 | Norieda |
| 2010/0295796 | A1* | 11/2010 | Roberts ............... G06F 3/0412 345/173 |
| 2011/0043455 | A1 | 2/2011 | Roth et al. |
| 2011/0055698 | A1* | 3/2011 | Ryu et al. .................. 715/702 |
| 2011/0080369 | A1* | 4/2011 | Chang et al. .............. 345/174 |
| 2012/0032979 | A1 | 2/2012 | Blow et al. |
| 2012/0229406 | A1 | 9/2012 | Wu |

OTHER PUBLICATIONS

Final Office Action for U.S. Appl. No. 13/604,490, mailed on Oct. 20, 2014, Giles D. McWilliam, "Display Adjustment to Accommodate Hand Position", 30 pages.
U.S. Appl. No. 12/871,302, filed Aug. 30, 2010, James D. Mackraz, "Rendering Content Around Obscuring Objects," 34 pages.
Office action for U.S. Appl. No. 12/871,302, mailed on Oct. 2, 2012, Mackraz, "Rendering Content Around Obscuring Objects," 19 pages.
Office Action for U.S. Appl. No. 13/604,490, mailed on Apr. 21, 2014, Giles D. McWilliam, "Display Adjustment to Accommodate Hand Position," 25 pages.
Office Action for U.S. Appl. No. 13/604,490, mailed on Feb. 24, 2015, Giles D. McWilliam, "Display Adjustment to Accommodate Hand Position", 31 pages.
Office action for U.S. Appl. No. 13/604,490, mailed on Aug. 5, 2015, McWilliam, "Display Adjustment to Accommodate Hand Position", 36 pages.

* cited by examiner

*Primary Examiner* — Kent Chang
*Assistant Examiner* — Nathan Brittingham
(74) *Attorney, Agent, or Firm* — Lee & Hayes, PLLC

(57) ABSTRACT

Techniques for reflowing content on a handheld electronic device are described herein. For example, content may be rendered on a display of a handheld electronic device. A user may grasp the device. In some cases, grasping the device may cause at least a portion of the rendered content to be obscured. The device may reflow the rendered content. For example, the device may reflow the content around the grasp of the user to enable the rendered content to be viewed without the user's grasp being altered.

20 Claims, 10 Drawing Sheets

RENDERING CONTENT AROUND OBSCURING OBJECTS

RELATED APPLICATION

This application is a continuation of and claims priority from U.S. patent application Ser. No. 12/871,302, filed on Aug. 30, 2010, the disclosure of which is incorporated by reference herein.

BACKGROUND

A large and growing population of users is enjoying entertainment through the consumption of digital content items (or simply "content items"), such as music, movies, images, electronic books, and so on. The users employ various electronic devices to consume such content items. Among these electronic devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes techniques for reflowing content around obscuring objects. For instance, in one example the techniques may render content on a display of a handheld electronic device before detecting that a user's grasp of the device obscures at least a portion of the content. Thereafter, and in response, the device may reflow the content around the grasp of the user, thus allowing the user to consume the content without the need to alter her grasp when she reaches the obscured portion of the content. In some instances, the device includes a touch-sensitive display that recognizes the grasp that obscures the content. In other instances, the device may recognize that the grasp obscures the content via a camera, a strain gauge, a light sensor, or in any other suitable manner.

In another example, an electronic device may comprise a projector that projects content onto a medium, such as onto a reflective screen, a tabletop, through the back of a translucent screen, or the like. Further, the electronic device may include a camera for detecting an object that obscures at least some of the projected content. For instance, the camera may detect an object that blocks projected content from reaching a display medium (e.g., a shadow on a wall or a cup on a table that blocks projected content), or an object that does not block the projected content from reaching the display medium but occludes a user's view of the content (e.g., a cup on a table that does not block the content directly but is in the line of sight of a user). In response to detecting either type of object, the electronic device may re-project the content around the obscuring object so as to allow a viewing user to continue viewing the content without obstruction.

For instance, in an example where the electronic device projects the content onto a tabletop on which on a coaster sits, the electronic device may recognize the coaster via the camera and may re-project the content around the coaster. Before re-projecting the content, the device may determine an area at which to refrain from projecting the content. The device may calculate this area with reference to an angle at which the device projects the content onto the medium and a viewing angle at which a user views the content. The device may determine this latter angle using a camera that is able to recognize a location of a face of a user, or by assuming a standard viewing angle. While this example describes the device identifying the coaster or other object using a camera, the electronic device may recognize the presence of the coaster via any other suitable techniques as discussed above.

Figure 1:
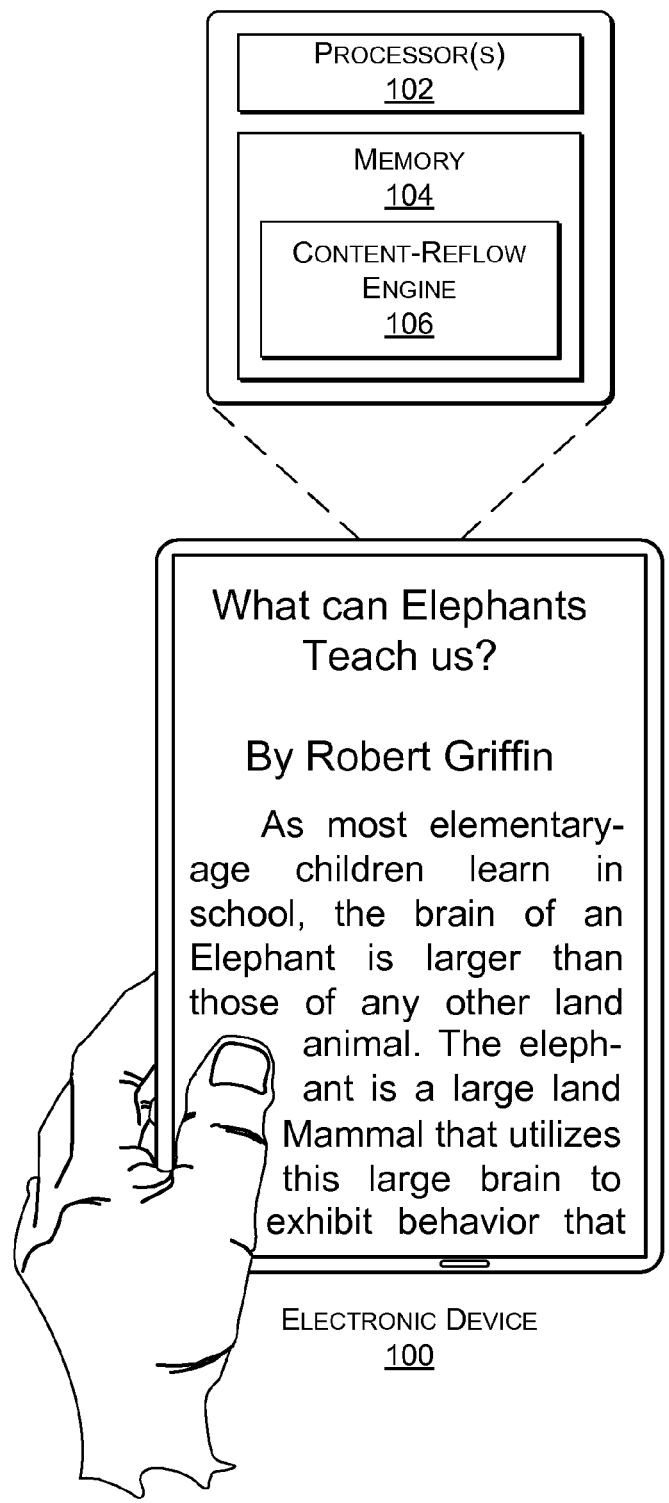
FIG. 1 illustrates an example electronic device that includes a content-reflow engine configured to reflow content around an object that obscures displayed content. In the illustrated example, the content-reflow engine reflows text from an electronic book around a thumb of a user grasping the device.

FIG. 1 illustrates an example electronic device 100 that may implement the techniques for reflowing content around obscuring objects. As illustrated, the electronic device 100 includes one or more processors 102 and memory 104, which stores a content-reflow engine 106. The memory 104 is an example of computer storage media and may include volatile and nonvolatile memory. Thus, the memory 104 may include, but is not limited to, RAM, ROM, EEPROM, flash memory, or other memory technology, or any other medium that can be used to store applications and data that the electronic device 100 can be access.

The electronic device 100, meanwhile, is representative of any mobile or handheld electronic device, as well as any stationary or fixed electronic device. For instance, the electronic device 100 may comprise an electronic book reader device, a tablet computing device, a laptop computer, a multifunction communication device, a portable digital assistant (PDA), an entertainment system, a portable media player, a camera, a video camera, a netbook, a notebook, a desktop computer, a gaming console, a DVD player, a media center, a kiosk, or any other type of device.

In each of these instances, the electronic device 100 may be configured with functionality to enable consumption of one or more types of contents items of any type or format including, for example, electronic texts (e.g., documents of any format, electronic periodicals, such as digital magazines and newspapers, etc.), digital audio (e.g., music, audible books, etc.), digital video (e.g., movies, television, short clips, etc.), images (e.g., art, photographs, etc.), and multi-media content. The terms "electronic book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc.

In the illustrated example, the electronic device 100 comprises a handheld device that includes a touch-sensitive display that renders an eBook comprising text. In this example, a user of the device 100 grasps the device with one of her thumbs residing on a front side of the display. As such, the touch-sensitive display may detect the presence of the thumb that extends past a bezel of the device and onto the display. That is, the touch-sensitive display may detect a touch input based on the presence of the thumb of the user on the display. Additionally or alternatively, the bezel of the device may include a touch sensor that may detect, in whole or in part, the presence of the user's thumb.

Figure 2A:
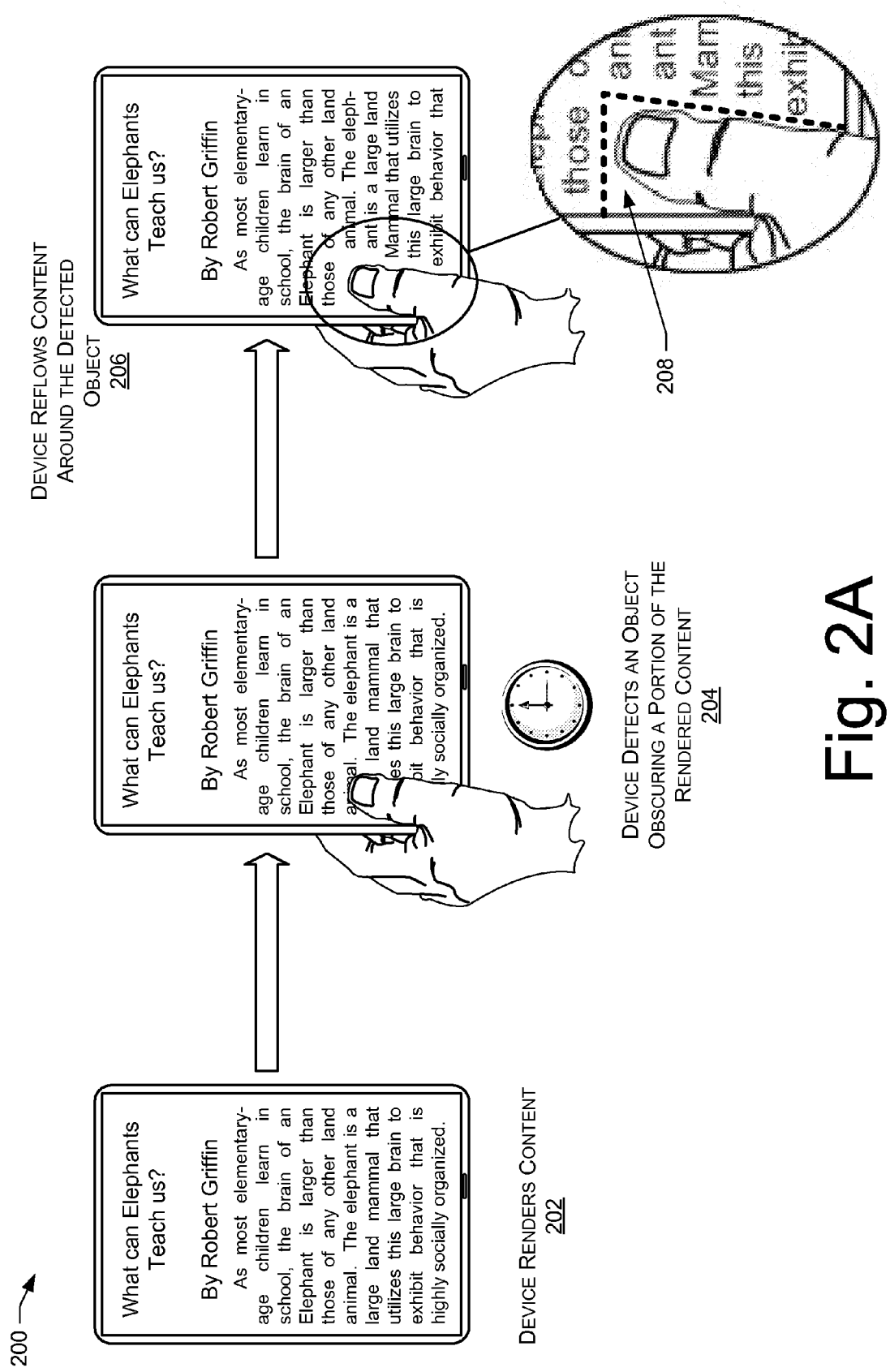
FIGS. 2A-C illustrate respective example processes of a device rendering content, detecting an object that obscures the content, and reflowing the content around the detected object. Again, in these examples the object comprises the user's thumb.

In addition, the content-reflow engine 106 and/or another module stored on the device 100 may determine that this touch input comprises a hold event (or simply the user holding the device) that occurs over a location where the device currently renders content. In response, the content-reflow engine 106 may reflow the rendered text of the eBook around the thumb of the user, as illustrated. By doing so, the user illustrated user is able to grasp the electronic device 100 (that includes a very small bezel or no bezel at all) in a comfortable manner and without having to reposition her hand as she reads down the rendered content. In some instances, a user of the device 100 is able to select whether or not to activate the functionality of the content-reflow engine 106 based on the user's preference. That is, the user may select whether or not the content-reflow engine 106 should reflow content around a hold event, or whether the engine should refrain from doing so FIG. 2A illustrates an example process 200 of the electronic device 100 reflowing the rendered content in the manner illustrated in FIG. 1. In some instances, the content-reflow engine 106 may perform each of the operations of this process. At 202, the electronic device 100 renders content, such as the illustrated eBook comprising text. While this example includes text, the device may render any other sort of content in other examples, such as images, videos, or the like, as discussed below with reference to FIGS. 2B and 2C.

At 204, the device 100 detects an object obscuring at least a portion of the rendered content. In some instances, the device 100 makes this determination in response to a receiving a touch input on a touch-sensitive display. In these instances, the device 100 may differentiate a true touch event from a hold event based at least in part on a size of the touch input, a force of the touch input, and a length of time of the touch input, possibly amongst other factors. For instance, the device may deduce that a relatively large touch input that resides at a same location for a relatively large amount of time comprises a hold event rather than a touch event, the latter of which may be characterized by a smaller, shorter touch input. In one example, a touch input may be classified as a hold event if it occurs at a same or similar location for more than a threshold amount of time and/or if the size of the touch input is greater than a threshold size.

After making the determination at 204, the device 100 reflows the content on the display of the device around the detected object at 206. As illustrated, the device 100 has shifted the text over to the right and has refrained from rendering content within a region 208 in which the object resides. In some instances, the device 100 determines a location of the object on the display, before calculating the region 208 within which to refrain from rendering content. In some instances, this area includes the entirety of the location of the detected touch input, as well as an additional portion of the display. In this manner, a user is able to see the content over the obscuring object, in this case her thumb.

Figure 2B:
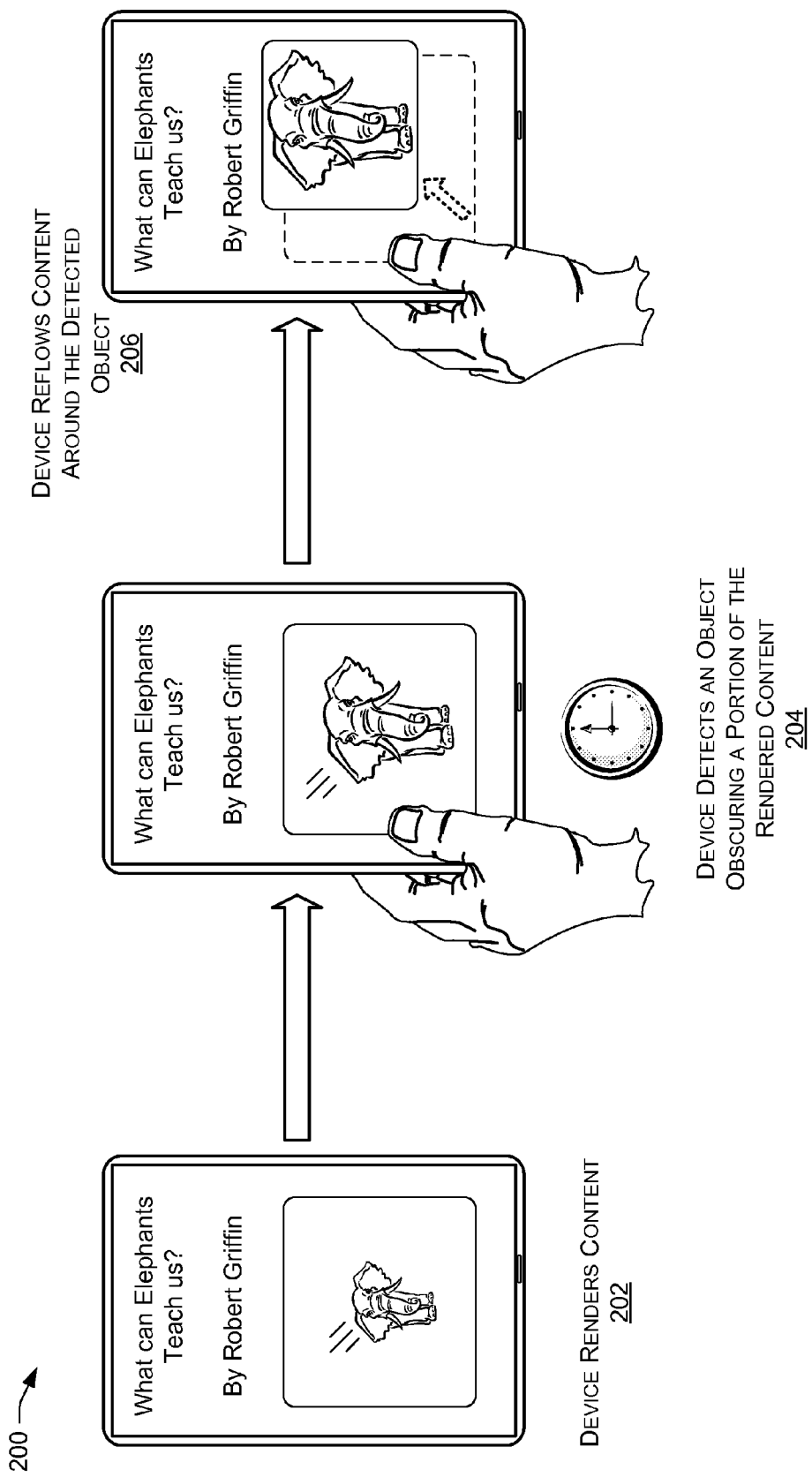
Figure 2C:
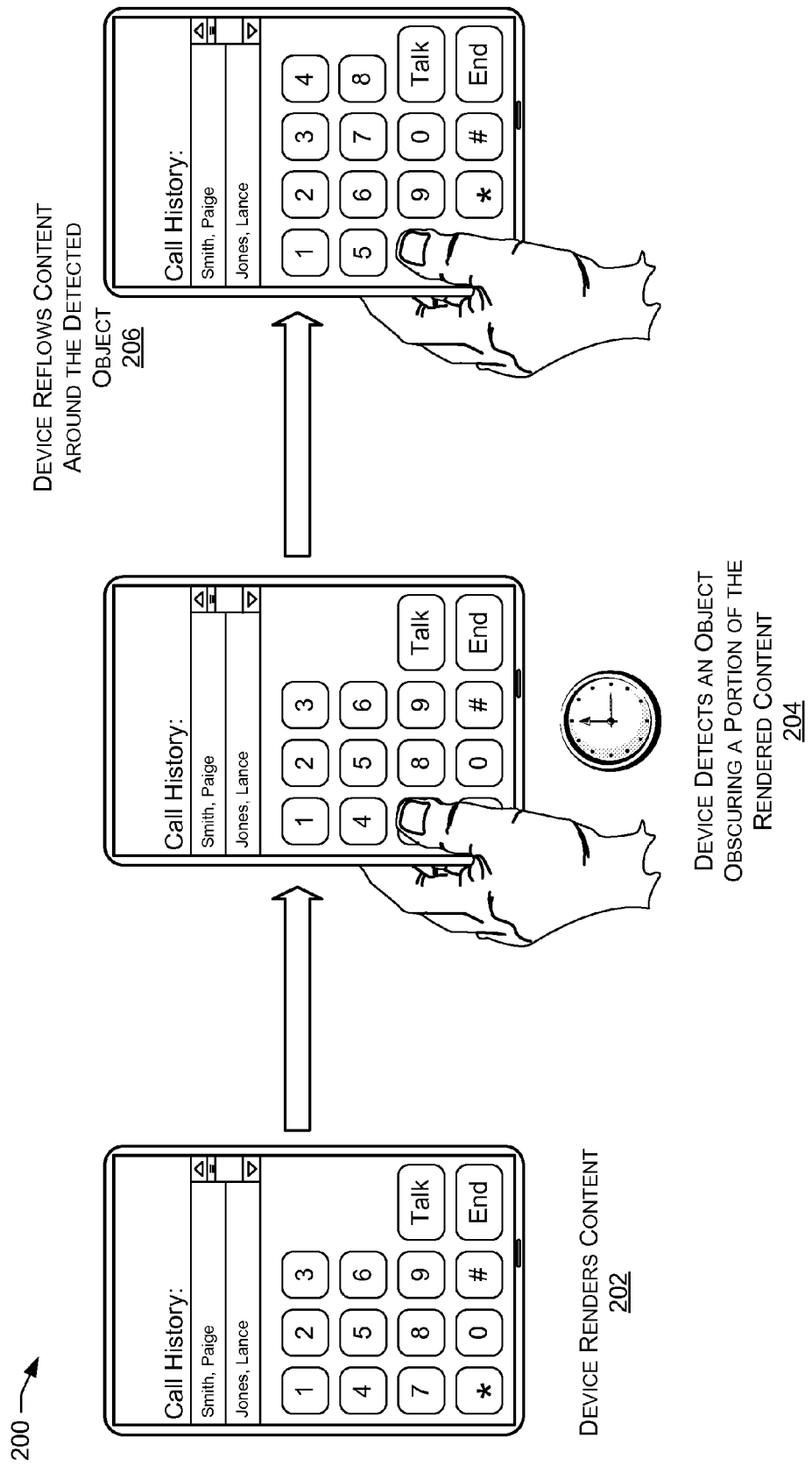

In this example, the content-reflow engine 106 has reflowed the text around the thumb of the user while maintain a current format (e.g., font size, etc. of the text). In other instances, however, the engine 106 may implement additional or alternative techniques. For instance, the engine 106 may resize the text, for instance. Further, in instances where the obscured content comprises a display element (e.g., an image, a video, text, or the like), the engine 106 may alter a position of the display element or may resize (e.g., shrink) the display element. FIGS. 2B and 2C illustrate two additional examples immediately below.

FIG. 2B illustrates the example process 200 described above with reference to FIG. 2A. Here, however, the device 100 renders a movie at 202. During the rendering of the movie, the device detects the user's thumb obscuring a portion of the movie for a threshold amount of time at 204. In response, the device 100 both resizes and shifts the position of the rendered movie at 206. As such, the user is able to view the entirety of the movie without the need to alter his or her grasp of the electronic device 100. While the device 100 resized and altered the position of the movie in this example, in other examples the device may resize a display element while refraining from altering the position of the display element, or vice versa.

FIG. 2C illustrates the example process 200 described above with reference to FIGS. 2A and 2B. Here, the device 100 renders icons for respective buttons of a phone application running on the device at 202. While this example describes phone icons, the illustrated icons may correspond to any other functionality in other implementations. During the rendering of the icons, the device detects the user's thumb obscuring a portion of the phone icons for a threshold amount of time at 204. As a part of the detection, the device 100 classifies the user's thumb on the touch sensor as a hold event rather than a touch event. That is, the device 100 determines that the user's thumb represents the user grasping the phone, and not an event that purposely provides an input for consumption and interpretation by the underlying phone application.

In response, the device 100 shifts the position of the icons at 206. As such, the user is able to view each of the icons of the device 100 without altering his or her grasp of the device 100. While FIGS. 2A-2C have illustrated several example types of content that may be reflowed or otherwise altered, any other type of visual content may similarly be reflowed or altered in other implementations.

Figure 3:
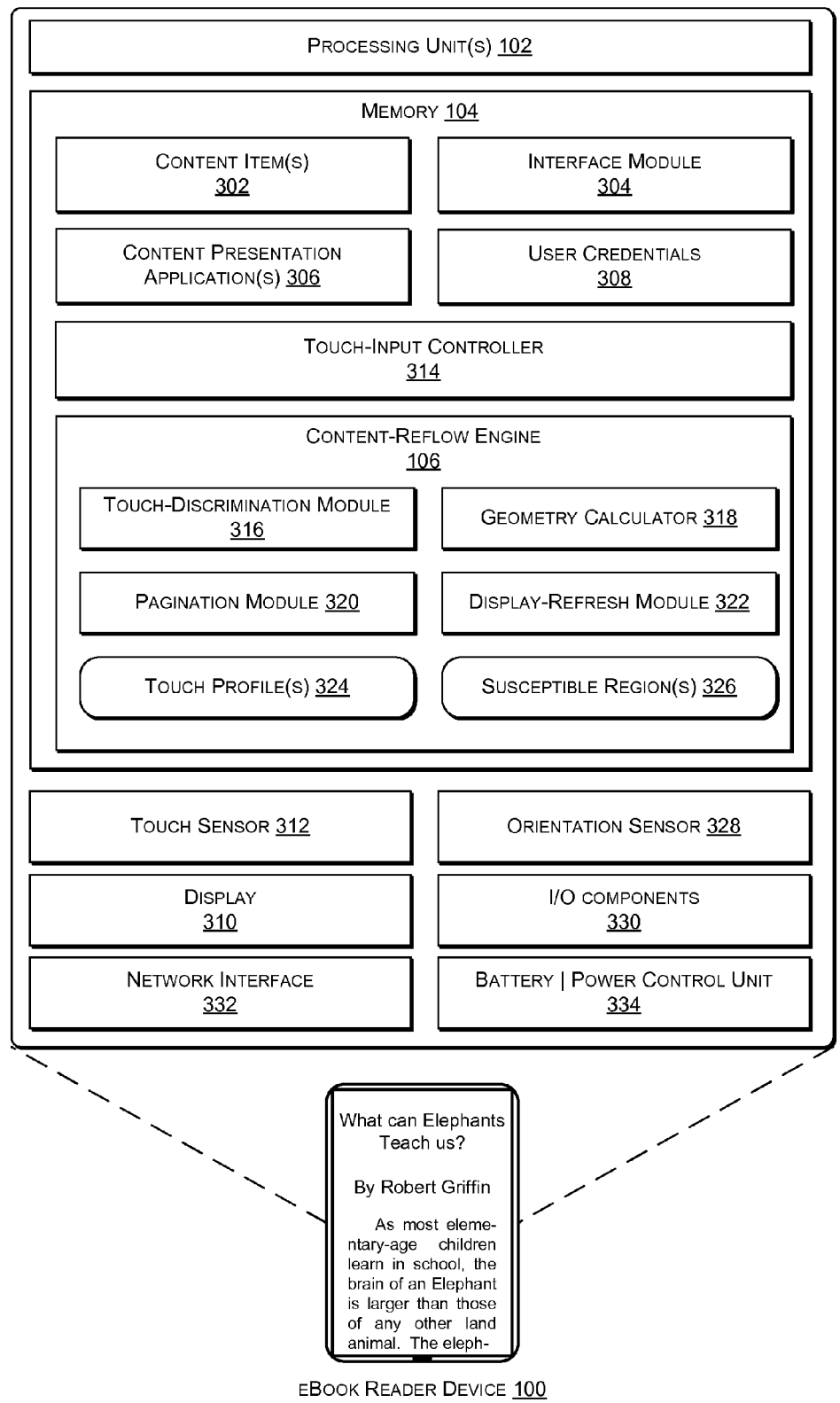
FIG. 3 is a block diagram of selected modules of an electronic device that includes the content-reflow engine for reflowing content around obscuring objects. In some implementations, the electronic device includes a touch-sensitive display for detecting touch inputs.

FIG. 3 is a block diagram of selected modules of the example electronic device 100 that includes the content-reflow engine 106 for reflowing content around obscuring objects. While FIG. 3 illustrates one possible implementation of the electronic device 100, other implementations may include more or fewer components. For instance, in one example, the device may simply comprise display technology, with other components described below residing on a remotely accessible server.

In a very basic configuration, the electronic device 100 includes the one or more processors 102 and the memory 104 described above with reference to FIG. 1. The memory 104 may be used to store any number of functional components that are executable on the one or more processors 102, as well as data and content items that are rendered by the electronic device 100. Thus, the memory 104 may store an operating system and a storage database to store one or more content items 302, such as eBooks, audio books, songs, videos, still images, and the like. The memory 104 may further include a memory portion designated as an immediate page memory to temporarily store one or more pages of an electronic book. The pages held by the immediate page memory are placed therein a short period before a next page request is expected.

The term "page," as used herein, refers to a collection of content that is presented at one time in a display of the electronic device 100, such as an electronic book reader device. Thus, a "page" may be understood as a virtual frame of the content, or a visual display window presenting the content to the user. Thus, "pages" as described herein are not fixed permanently, in contrast to the pages of published "hard" books. Instead, pages described herein may be redefined or repaginated when, for example, the user chooses a different font for displaying the content in the first display. In addition to pages, the terms "page views", "screen views", and the like are also intended to mean a virtual frame of content.

An interface module 304 may also reside in memory 104 and may execute on the one or more processors 102 to provide for user operation of the device 100. The interface module 304 may provide menus and other navigational tools to facilitate selection and rendering of the content items 302. The interface module 304 may further include a browser or other application that facilitates access to sites over a network, such as websites or online merchants.

One or more content presentation applications 306 render the content items 302. The content presentation applications 306 may be implemented as various applications depending upon the content items. For instance, the applications 306 may include an electronic book reader application for rending electronic books, an audio player for playing audio books or songs, a video player for playing video, and so forth.

The memory 104 may also store user credentials 308. The credentials 308 may be device specific (set during manufacturing) or provided as part of a registration process for a service. The credentials may be used to ensure compliance with DRM aspects of rendering the content items 302.

FIG. 3 further illustrates that the electronic device 100 may include a display 310, which may be passive, emissive or any other form of display. In one implementation, the display uses electronic paper (ePaper) display technology, which is bi-stable, meaning that it is capable of holding text or other rendered images even when very little or no power is supplied to the display. Some example ePaper-like displays that may be used with the implementations described herein include bi-stable LCDs, MEMS, cholesteric, pigmented electrophoretic, and others. In other implementations, or for other types of devices, the display may be embodied using other technologies, such as LCDs and OLEDs, and may further include a touch screen interface.

The electronic device 100 may further include a touch sensor 312 and, in memory 104, a touch-input controller 314. In some implementations, the touch sensor 312 and the touch-input controller 314 integrate with the display 310 to form a touch-sensitive (or "touch-screen") display. In these instances, a user of the device 100 may operate the device by providing touch inputs to the touch-sensitive display.

Finally, in this example the memory 104 may store or otherwise have access to the content-reflow engine 106. As illustrated, the engine 106 includes a touch-discrimination module 316, a geometry calculator 318, a pagination module 320, a display-refresh module 322, one or more touch profiles 324, and one or more indications of respective regions that are susceptible to hold events (or "susceptible regions").

The touch-discrimination module 316 functions to identify objects that are obscuring at least a portion of the content rendered on the display 310, as well as a location of these objects. For instance, the touch-discrimination module 316 may function to differentiate a touch event from a hold event. A touch event may comprise a touch input where the user is purposefully providing a command to the device 100. For instance, a user employing a finger or stylus to select a hyperlink on a touch-sensitive display is one example of a touch event. A hold event, meanwhile, may comprise the user simply holding the device 100 in a manner that obscures content that the device 100 renders.

In instances where the display 310 comprises a touch-sensitive display, the touch-discrimination module 316 may differentiate a touch event from a hold event with reference to: (1) a touch profile of a current touch input, and (2) the one or more stored touch profiles 324. For instance, these stored touch profiles 324 may define an archetypal (or representative) profile of a touch input from a stylus, from a finger, from a thumb, a palm, and the like. The touch-discrimination module 316 may then use this comparison to determine which one of the touch profiles 324 is a closest match to the current touch input in order to classify the touch input as a touch event or a hold event. For instance, if the module 316 determines that a received touch input most closely resembles a stylus input, then the module 316 may classify the touch input as a touch event. Conversely, if the module 316 determines that a received touch input most closely resembles a thumb input, then the module 316 may classify the touch input as a hold event.

In some implementations, the touch-discrimination module 316 classifies a received touch input as either a touch event or a hold event using a series of weights. For instance, a received touch input may be weighted as more likely to be a hold event if the touch profile of the event more closely resembles the touch profile of a thumb. Furthermore, the touch-discrimination module 316 may take into account a location of the touch as well. For instance, the module 316 may compare a location of a received touch input to the one or more susceptible regions 326.

These regions 326 may comprise those regions where hold events are more likely to occur, such as areas where the display is likely be held by the user. In some instances, these regions 326 are based at least in part on an orientation of the device as determined by an orientation sensor 328 of the device, such as a gyroscope or accelerometer. For example, the bottom-left and bottom-right regions of the display 310 may comprise susceptible regions, with directionality being defined by a current orientation of the device 100.

The module 316 may further weight a received touch input based on a variety of other factors. For instance, when the electronic device 100 includes a touch sensor on the back of the device opposite the display 310, the module 316 may determine a location of a user's fingers to deduce the location of the user's thumb on the display 310, using inverse kinematics for instance. In still another example, the device 100 may include a camera or microphone that is able to recognize an identity of a user (e.g., using facial or voice recognition) as well as that user's ordinary habits when holding the device. After weighting a received touch event using one or more of these and other manners, the touch-discrimination module 316 is able to label the input as either a touch event or a hold event. In still other instances the module 316 may label inputs as either touch events or hold events with reference to an amount of noise of the corresponding events. This may include analyzing a frequency domain of an event, determining whether the event appears to remain stationary or whether the event appears to move, determining an amount of time of the event, identifying a shape of the event, measuring an amount of pressure of the event, measuring a statistical deviation of the event, and/or analyzing any other factors used in identifying signal processing noise.

In these latter instances, the device 100 may label the input as unintentional and may refrain from selecting any hyperlinks within an area of the touch, or the like. In addition, the content-reflow engine 106 may proceed to reflow the rendered content as illustrated above with reference to FIGS. 1 and 2. To do so, the geometry calculator 318 may calculate an area around the received touch input in which to refrain from rendering content within. This area may include the area of the touch in addition to a threshold amount of surrounding or buffering area. By doing so, the device presumes that the object (such as the thumb) includes some height in the z-axis over which the viewer is viewing the rendered content. Therefore, providing this buffering area beyond the area of the touch allows the user to view the rendered content without readjusting her grasp of the device, for example.

In one implementation, the geometry calculator 318 attempts to fit a shape, such as an ellipse or any other shape, to the profile of the received touch input. Thereafter, in the ellipse example, the calculator 318 identifies a major axis of the ellipse and locates nearest edge of the display 310 along the line of this axis. The calculator then labels some area on both sides of this line as part of a region to be masked. That is, the calculator instructs the display-refresh module 322 to refrain from rendering content in the calculated area that includes both the area of the touch input and a region of the display on either side of the major-axis line extending to the nearest edge of the display. In some instances, the geometry calculator 318 also includes, in this area, a portion of the display extending perpendicularly from the nearest edge of the display to the furthest edge of the touch input, with some additional buffer area as illustrated and discussed below with reference to FIG. 7.

Finally, after the geometry calculator 318 determines the region in which to refrain from rendering content, the pagination module 320 may determine which content of the rendered content item fits onto the display 310 less the calculated area. After making this determination, the pagination module 320 provides an indication of this content and the pagination or layout of this content to the display-refresh module 322, which in turn renders the content in this manner. In some instances, the display-refresh module 322 will continue to render content in this new layout as the user progresses through the content item (e.g., as the user turns pages within an eBook) until the content-reflow engine 106 determines that the obscuring object has been removed and/or that a new object is obscuring a different or additional portion of the display 310.

The electronic device 100 may further be equipped with various input/output (I/O) components 330. Such components may include various user interface controls (e.g., buttons, a joystick, a keyboard, etc.), audio speakers, connection ports, and so forth. A network interface 332, meanwhile, supports both wired and wireless connection to various networks, such as cellular networks, radio, WiFi networks, short range networks (e.g., Bluetooth), IR, and so forth.

The electronic device 100 also includes a battery and power control unit 334. The battery and power control unit operatively controls an amount of power, or electrical energy, consumed by the eBook reader device. Actively controlling the amount of power consumed by the reader device may achieve more efficient use of electrical energy stored by the battery.

The electronic device 100 may have additional features or functionality. For example, the electronic device 100 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 4:
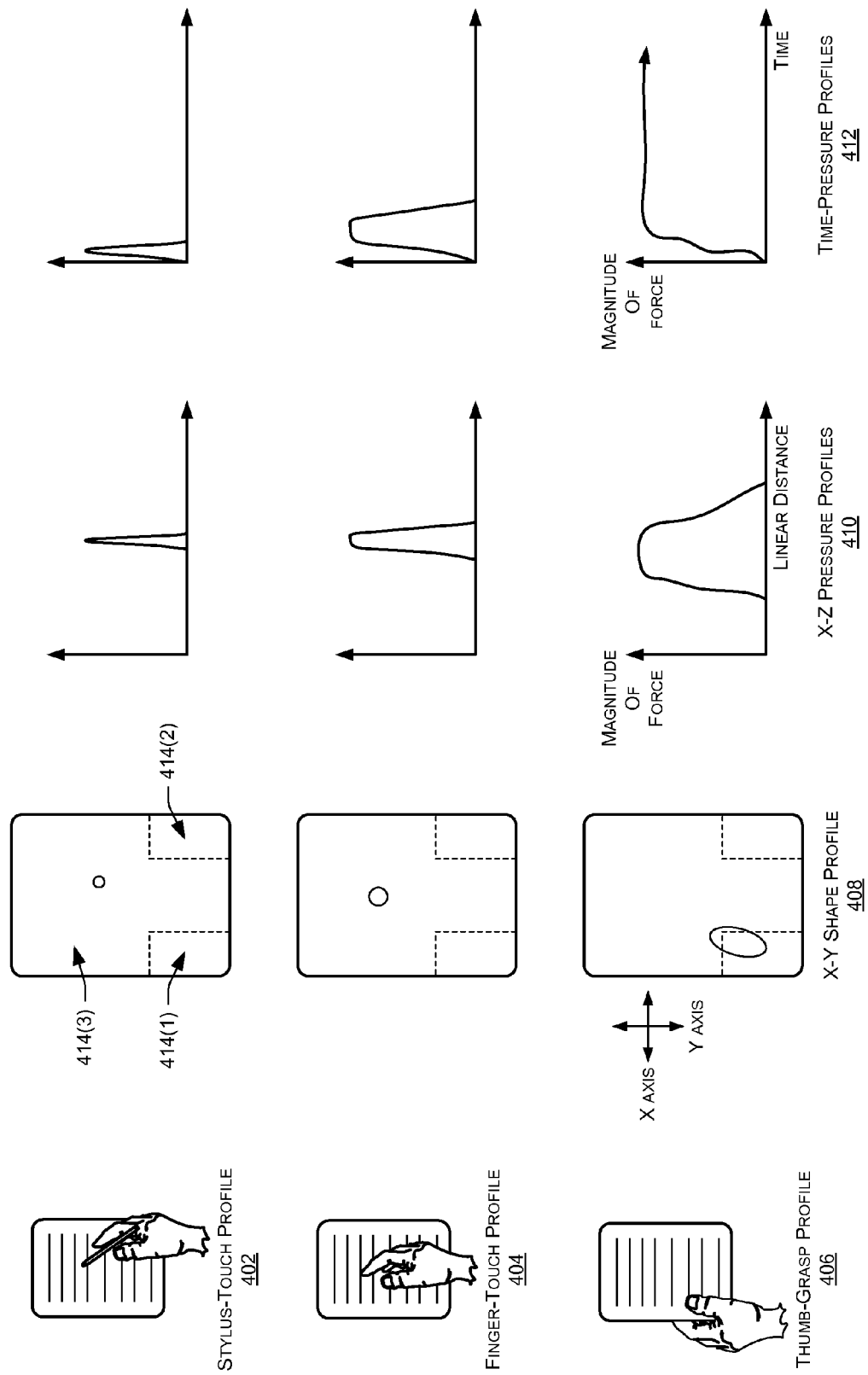
FIG. 4 illustrates example touch profiles that the electronic device of FIGS. 1-3 may reference when determining when a touch input received on a touch-sensitive display comprises a touch event or a hold event. In the former instances, the device may attempt to interpret the input and perform a pre-specified command, while in latter instances the device may reflow content around the area associated with the hold event.

FIG. 4 illustrates example ones of the archetypal touch profiles 324 that the electronic device 100 of FIGS. 1-3 may reference when determining whether a received touch input comprises a touch event or a hold event. As discussed above, in the former instances, the device may attempt to interpret the input and perform a pre-specified command, while in latter instances the device may reflow content around the area associated with the hold event.

As illustrated, the example touch profiles include a stylus-touch profile 402, a finger-touch profile 404, and a thumb-grasp profile 406. Each of these profiles includes an x-y shape profile 408, an x-z pressure profile 410, and a time-pressure profile 412. While FIG. 4 illustrates example characteristics of a touch profile, other implementations may employ multiple other heuristics. For instance, a touch profile of a grasping thumb or finger may include a three-dimensional pressure map that is unique to a particular user's thumb or a generic thumb based on physiology of the particular user or a generic user.

In this example, the x-y shape profiles 408 represent a shape of a touch received on a touch-sensor, such as a touch-sensitive display of the electronic device 100. As illustrated, the x-y shape profile 408 associated with the stylus touch is a relatively small circle (corresponding to the end of a stylus), while the x-y shape profile 408 associated with the finger touch is a slightly larger circle (corresponding to the end of a finger). The x-y shape profile 408 associated with the thumb grasp, meanwhile, is an even larger ellipse (corresponding to the shape of a thumb). Further, each of these x-y shape profiles indicates two example susceptible regions 414(1) and 414(2) where hold events may be more likely to occur. These profiles also illustrate a non-susceptible region 414(3). In this example, the x-y shape profile of the thumb grasp shows that this touch input may occur substantially within one of the two susceptible regions 414(1) and 414(2).

FIG. 4 also illustrates the x-z pressure profile 410 for the archetypal stylus touch, the archetypal finger touch, and the archetypal thumb grasp. Each of these profiles 410 represents an archetypal amount of pressure experienced by the touch sensor (along a linear distance of the touch sensor) when a user provides a respective type of input. As illustrated, a typical stylus input provides pressure to only a small linear distance of the touch sensor, while a finger touch provides pressure to a slightly greater linear distance, and thumb grasp provides pressure to a linear distance that is much greater than both the stylus and the finger.

Finally, FIG. 4 illustrates the time-pressure profiles 412 for the archetypal stylus touch, the archetypal finger touch, and the archetypal thumb grasp. Each of these profiles 412 represents a typical amount of time that the touch sensor experiences or detects the input. As illustrated, both the stylus and the finger input last for a relatively short amount of time, while the thumb grasp lasts for a much larger amount of time, typically while the user consumes the entire page of content on the display 310. This greater amount of time indicates that the thumb grasp is in fact simply a user holding the device rather than providing an explicit navigational command or the like.

Figure 5:
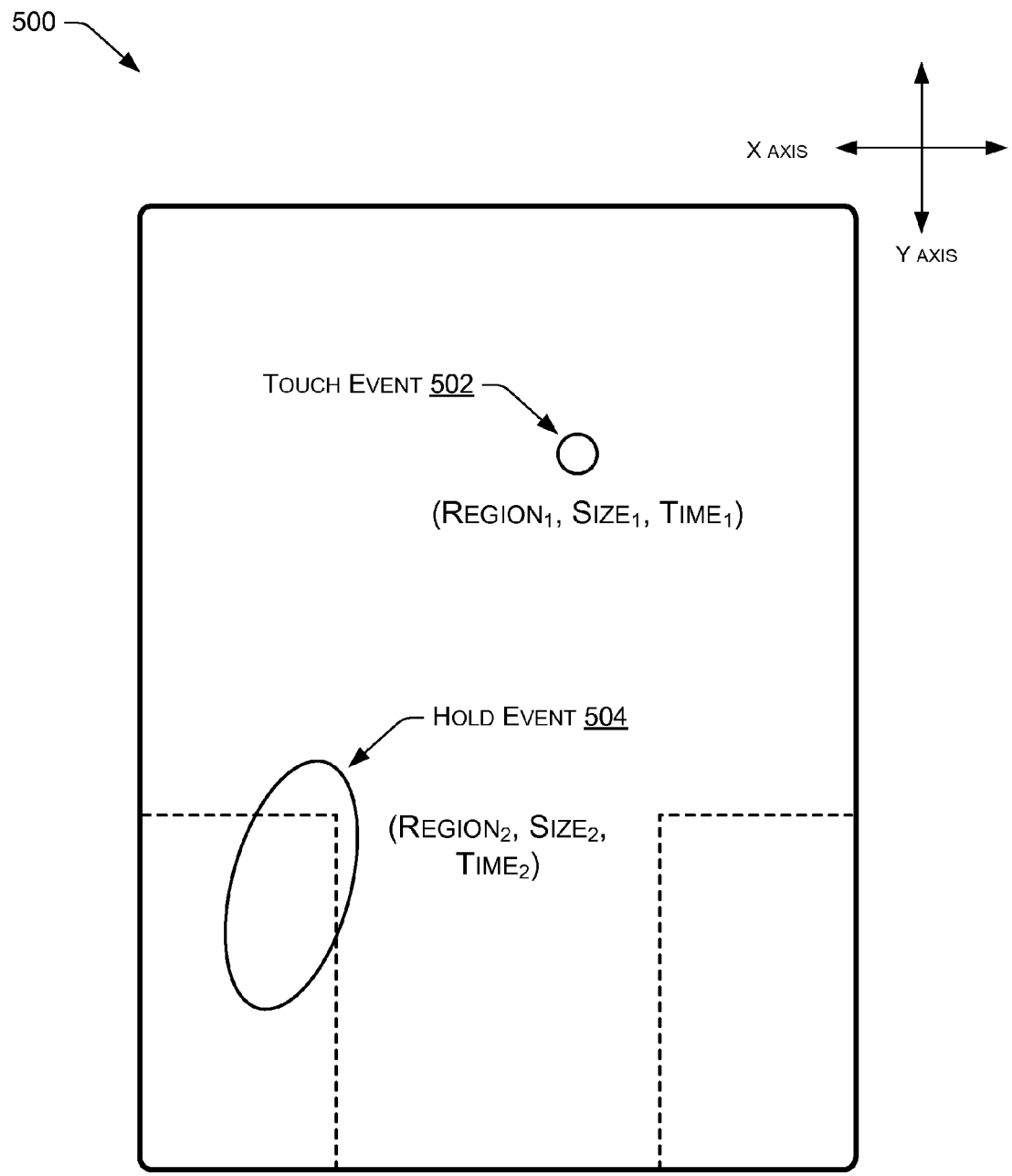
FIG. 5 illustrates an example hold event contrasted with an example touch event.

FIG. 5 illustrates an example touch event 502 contrasted with an example hold event 504. Each of these events represents a touch input received at a touch sensor, such as on a touch-sensitive display of the electronic device 100.

As illustrated, the example touch event 502 event occurs within a certain region of the display that is "non-susceptible" ($Region_1$), has a shape of a certain size ($Size_1$), and is experienced by the touch sensor for a certain amount of time ($Time_1$). The example hold event 504, meanwhile, occurs within a different region of the display that is indeed "susceptible" to hold events (Region), has a shape of a certain, larger size ($Size_2$), and is experienced by the touch sensor for a much greater amount of time ($Time_2$). In some instances, the touch-discrimination module may use these different parameters to deduce that the hold event 504 is in fact a hold event and should be treated as such, while the touch event is in fact a touch event.

Figure 6:
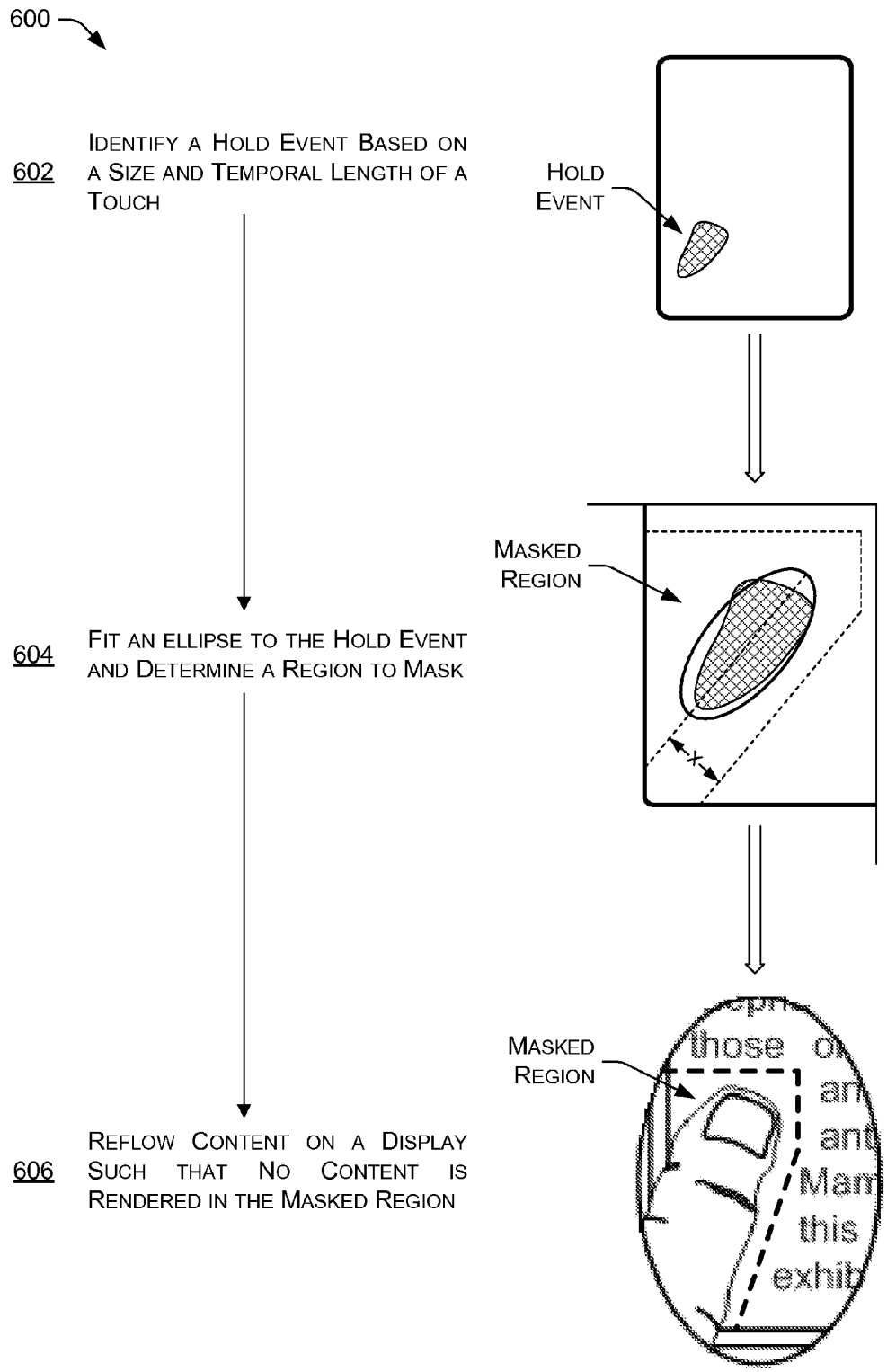
FIG. 6 is a pictorial flow diagram showing a process of identifying a hold event, fitting an ellipse to the hold event to determine a region to mask, and reflowing the content such that no content is rendered in the masked region.

FIG. 6 is a pictorial flow diagram showing a process 600 for reflowing content in response to identifying a hold event. First, at 602, the touch-discrimination module 316 of the electronic device 100 may identify a hold event based at least in part on a size and a temporal length of a touch input. For instance, a relatively large touch input that occurs for a long period of time may be indicative of a hold event, in contrast to a small, short touch input. The module 316 may identify the hold event by comparing the received touch input with any one or more of the profiles discussed above. This hold event may occur while content is rendered on a display of an electronic device, such as the device 100.

At 604, the geometry calculator 318 of the device 100 may fit an ellipse, an ellipsoid, or any other shape to the hold event. In addition, the calculator 318 may determine a region to mask based at least in part on this ellipse.

To do so, the calculator 318 may identify a major axis of this fitted ellipse and may extrapolate this axis to a nearest edge of the display, as illustrated. Then, the calculator may determine an offset "x" from the major axis. In some instances, the offset "x" increases as the overall size of the fitted ellipse increases. That is, the larger the hold event, the larger the region to be masked, in some instances. The calculator may then use this offset to determine a region to be masked. In some instances, the calculator 318 creates an area that is defined by lines that are orthogonal from the edge of the display and that intersect the lines determined by the offset "x." In some instances, such as the example illustrated in FIG. 6, the calculator 318 defines a top of the masked region by these orthogonal lines, while refraining from doing so on the bottom. This embodiment may work well for reflowing text, as each line of text will remain unbroken by the obscuring object, such as the thumb of the user. While FIG. 6 illustrates one manner of determining a region to mask, other implementations may determine this region in any other manner. For instance, some implementations may determine this region with reference to heuristics regarding how a particular user or users generally grasp a device. Finally, at 606, the content-reflow engine 106 reflows the content such that content does not appear within the masked region.

Figure 7:
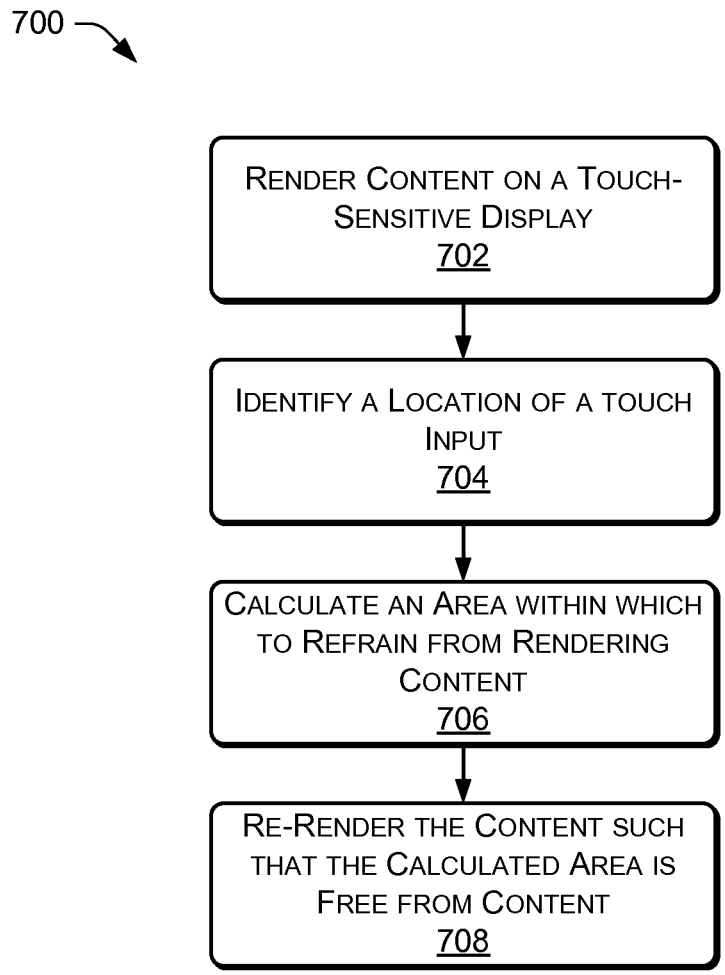
FIGS. 7-8 are flow diagrams showing processes of reflowing content around obscuring objects.
Figure 8:
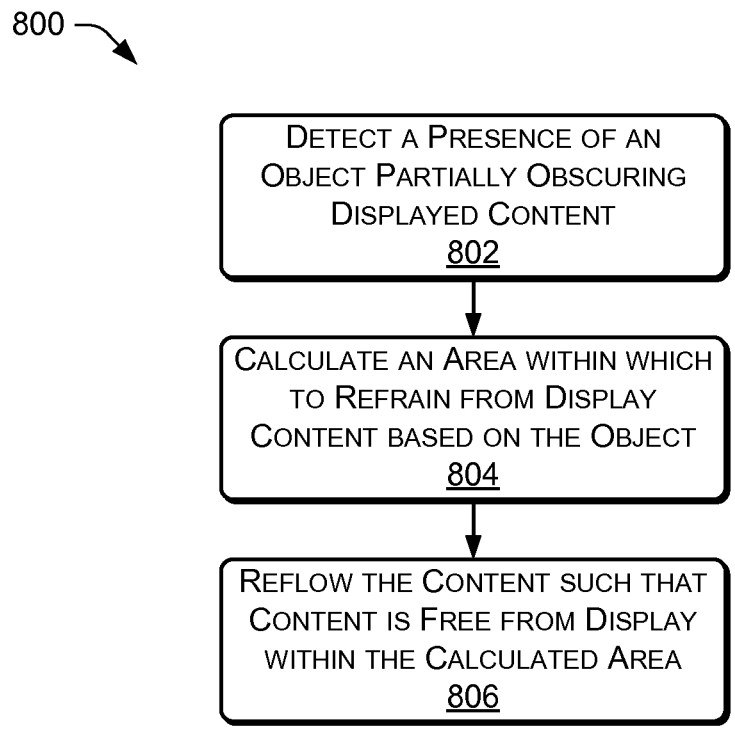

FIGS. 7-8 are flow diagrams showing respective processes 700 and 800 of reflowing content around obscuring objects. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process 700 includes an operation 702, which represents rendering content on a touch-sensitive display. This content may comprise text, images, video, and/or any other form of content. Next, an operation 704 represents identifying a location of a touch input. In some instances, this touch input is associated with an object that obscures at least a portion of the content on the display. For instance, the touch input may comprise a hold event. An operation 706, meanwhile, represents calculating an area of the display within which to refrain from rendering content. In some instances, this area may be based at least in part on the identified location of the touch input. For instance, this area may include at least the location of the touch, possibly in addition to an additional area of the display. Finally, an operation 708 represents re-rendering the content such that the calculated area is free from content.

FIG. 8 illustrates the process 800, which includes an operation 802. This operation represents detecting a presence of an object at least partially obscuring displayed content. This content may be displayed on an electronic display, or may be projected onto a non-powered display medium. In either instance, an operation 804 represents calculating an area within which to refrain from displaying content, with this area being based at least in part on the location of the object. Finally, an operation 806 represents reflowing the content such that the content is free from display within the calculated area.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
    displaying content on a touch-sensitive display;
    detecting a touch input on a first area of the touch-sensitive display;
    fitting a shape to the first area;
    determining a second area that encompasses the first area, wherein determining the second area comprises:
        determining a first line at a diagonal to an edge of the touch-sensitive display, wherein the first line is about parallel to an axis of the shape and extends to the edge of the touch-sensitive display, and wherein the first line comprises a first bound to the second area, and
        determining a second line that is about perpendicular to the edge of the touch-sensitive display, wherein the second line extends to the edge of the touch-sensitive display, and wherein the second line comprises a second bound to the second area; and
    redisplaying the content outside the second area of the touch-sensitive display.

2. The computer-implemented method as recited in claim 1, wherein redisplaying the content comprises:
    shifting a position of the content in a direction that the content avoids being displayed in the second area.

3. The computer-implemented method as recited in claim 1, wherein redisplaying the content comprises:
    resizing a display element of the content to create a resized display element, the display element comprising at least one of text, an image, an icon, or a video window; and
    altering a position of the resized display element to avoid the second area.

4. The computer-implemented method as recited in claim 1, wherein redisplaying the content comprises:
    determining that the touch input comprises a hold event; and
    redisplaying the content based at least partly on determining that the touch input comprises the hold event.

5. The computer-implemented method as recited in claim 4, wherein determining that the touch input comprises the hold event comprises:
    determining that a length of time associated with the touch input is greater than a predetermined time threshold.

6. The computer-implemented method as recited in claim 4, wherein determining that the touch input comprises the hold event comprises:
    determining that an amount of pressure exerted by the touch input is greater than a predetermined pressure threshold.

7. The computer-implemented method as recited in claim 1, wherein the shape comprises one of a circle or an ellipse.

8. A method comprising:
    detecting a touch input on a display device;
    fitting a shape to the touch input;
    determining a major axis associated with the shape;
    determining a first area on one side of the major axis, wherein the first area is bounded by a first line that is approximately perpendicular to an edge of the display device, wherein the first line extends to the edge of the display device;
    determining a second area on an opposite side of the major axis relative to the first area, wherein the second area is bounded by a second line that is approximately at a diagonal to the edge of the display device, and wherein the second line extends to the edge of the display device;
    determining a third area comprising a sum of the first area, the second area, and an area of the shape; and
    arranging content displayed on the display device to exclude the third area.

9. The method as recited in claim 8, wherein the shape comprises an ellipse.

10. The method as recited in claim 8, wherein the method further comprises:
    determining that the touch input comprises a hold event.

11. The method as recited in claim 10, wherein determining that the touch input comprises the hold event comprises:
    determining a touch profile of the touch input;
    comparing the touch profile with one or more stored profiles, the stored profiles including at least one of a stylus profile, a finger profile, a thumb profile, or a palm profile; and
    determining that the touch profile corresponds to a profile of the one or more stored profiles.

12. The method as recited in claim 10, wherein determining that the touch input comprises the hold event comprises:
    determining one or more of a size of the touch input, a force of the touch input, or a length of time associated with the touch input; and
    determining that the touch input comprises the hold event based on one or more of:
        comparing a size of the touch input to a threshold size;
        comparing a force of the touch input to a predetermined force threshold; or
        comparing a length of time associated with the touch input with a threshold time period.

13. The method as recited in claim 8, wherein arranging the content displayed on the display device to exclude the third area comprises:
    shifting at least a portion of the content that is displayed away from the third area.

14. The method as recited in claim 8, wherein arranging the content displayed on the display device to exclude the third area comprises:
    resizing at least a portion of the content that is displayed to fit a portion of the display device that excludes the third area.

15. An electronic device comprising:
    a display device;
    one or more processors executing instructions to perform operations comprising:
        displaying content on the display device;
        detecting a touch input on a first area of the display device;
        determining a first line that is approximately parallel to a major axis of the first area, wherein the first line is at a diagonal to an edge of the display device, and wherein the first line extends to the edge of the display device;
        determining a second line that is approximately perpendicular to an edge of the display device, the second line extending to the edge of the display device;
        determining a second area based at least partly on the first area, the first line, and the second line; and
        displaying the content on a portion of the display device that excludes the second area.

16. The electronic device as recited in claim 15, wherein the touch input on the first area of the display device is detected using at least one of: a touch sensor associated with the display device, a touch sensor associated with a bezel of the display device, a camera, a strain gauge, or a light sensor.

17. The electronic device as recited in claim 15, wherein displaying the content on the portion of the display device that excludes the second area comprises:
- determining a user preference associated with displaying the content;
- modifying a size of the content to create modified content; and
- displaying the modified content on the portion of the display device that excludes the second area based at least partly on the user preference.

18. The electronic device as recited in claim 17, wherein modifying the size of the content to create modified content comprises:
- modifying a size of one or more of an image element, a video element, or text included in the content.

19. The electronic device as recited in claim 15, the operations further comprising:
- determining a location of the touch input on the display device;
- determining that the touch input comprises a hold event based at least partly on the location of the touch input on the display device.

20. The electronic device as recited in claim 18, the operations further comprising:
- determining an orientation of the electronic device;
  - determining that the touch input comprises a hold event based at least partly on the orientation of the electronic device.

\* \* \* \* \*